United States Patent [19]

Smith

[11] Patent Number: 5,709,512
[45] Date of Patent: Jan. 20, 1998

[54] FRICTIONALLY RESTRAINED VEHICULAR STORAGE UNIT

[76] Inventor: Christian M. Smith, 33 Tappan St., Apartment 1, Melrose, Mass. 02176

[21] Appl. No.: 565,301

[22] Filed: Nov. 27, 1995

[51] Int. Cl.⁶ ............................................. E04G 25/00
[52] U.S. Cl. ...................... 410/129; 296/37.6; 248/200.1
[58] Field of Search ................................ 224/309, 311, 224/326, 923; 410/122, 123, 129, 153, 156; 248/200.1, 218.4, 352, 354.3, 354.4

[56] References Cited

U.S. PATENT DOCUMENTS

| | | | |
|---|---|---|---|
| 2,219,169 | 10/1940 | Alter | 248/200.1 |
| 3,043,642 | 7/1962 | Nelson et al. | 248/200.1 |
| 3,265,261 | 8/1966 | Kenrick et al. | 248/200.1 |
| 3,401,652 | 9/1968 | Thor | 248/200.1 |
| 3,519,293 | 7/1970 | Henning et al. | 248/200.1 |
| 3,850,332 | 11/1974 | Marko | 220/22 |
| 3,995,565 | 12/1976 | Kersey | 248/200.1 |
| 4,088,365 | 5/1978 | Johnson | 296/37.6 |
| 4,449,876 | 5/1984 | Glanton | 248/354.3 |
| 4,456,415 | 6/1984 | Joice-Cavanagh | 410/129 |
| 4,860,913 | 8/1989 | Bertolini | 220/1.5 |
| 4,898,284 | 2/1990 | Arens | 296/37.6 |
| 5,378,095 | 1/1995 | Schultz | 410/151 |
| 5,596,934 | 1/1997 | Hamm et al. | 248/354.3 |

*Primary Examiner*—Karen B. Merritt
*Assistant Examiner*—Gregory A. Morse
*Attorney, Agent, or Firm*—O'Connell Law Firm

[57] ABSTRACT

A method and apparatus for frictionally restraining a storage unit in the interior of a vehicle to resist motion relative to the vehicle to eliminate the need for alternative or additional connection to the vehicle's interior. The apparatus has at least one frictionally engaging device having an operative engaging portion, a mechanism for attaching the frictionally engaging device to a storage unit desired to be restrained, and a mechanism for actuating the frictionally engaging device operably connected to the frictionally engaging device. The apparatus being capable of restraining a storage unit in the interior of a vehicle upon actuation of the frictionally engaging device.

12 Claims, 6 Drawing Sheets

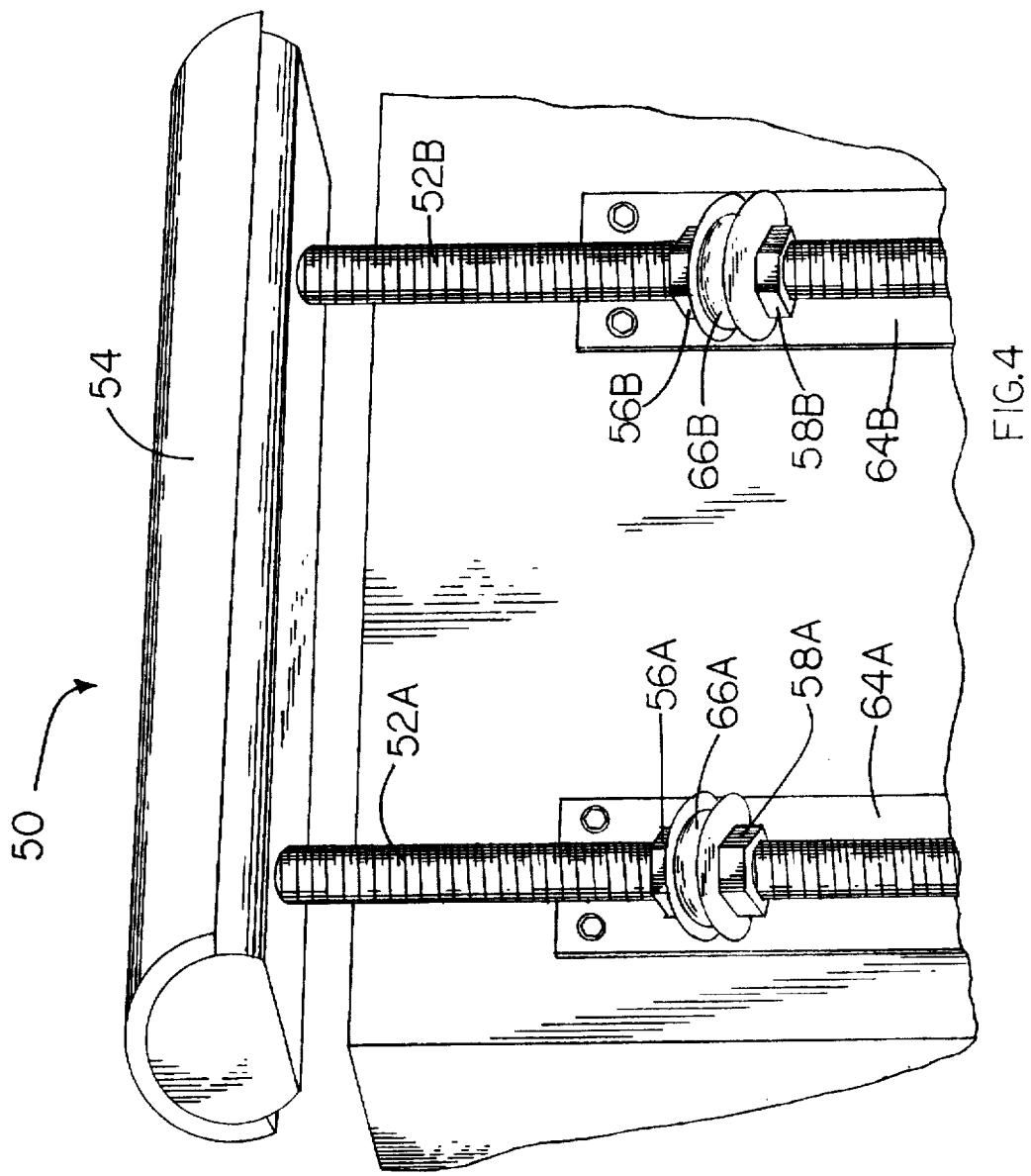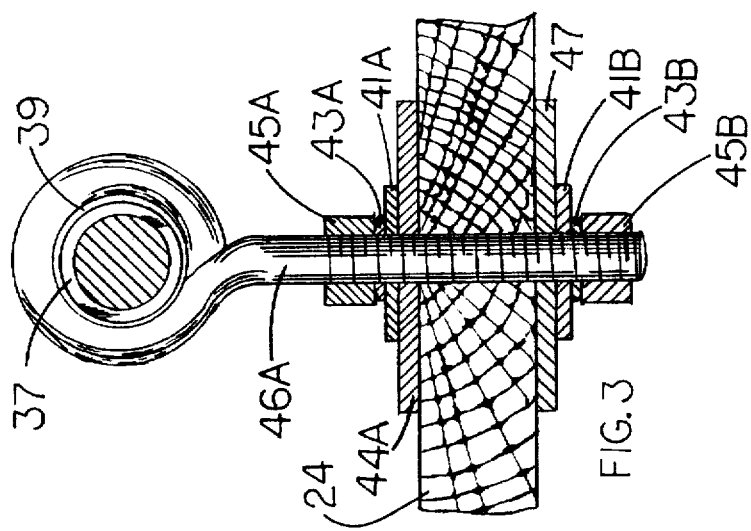

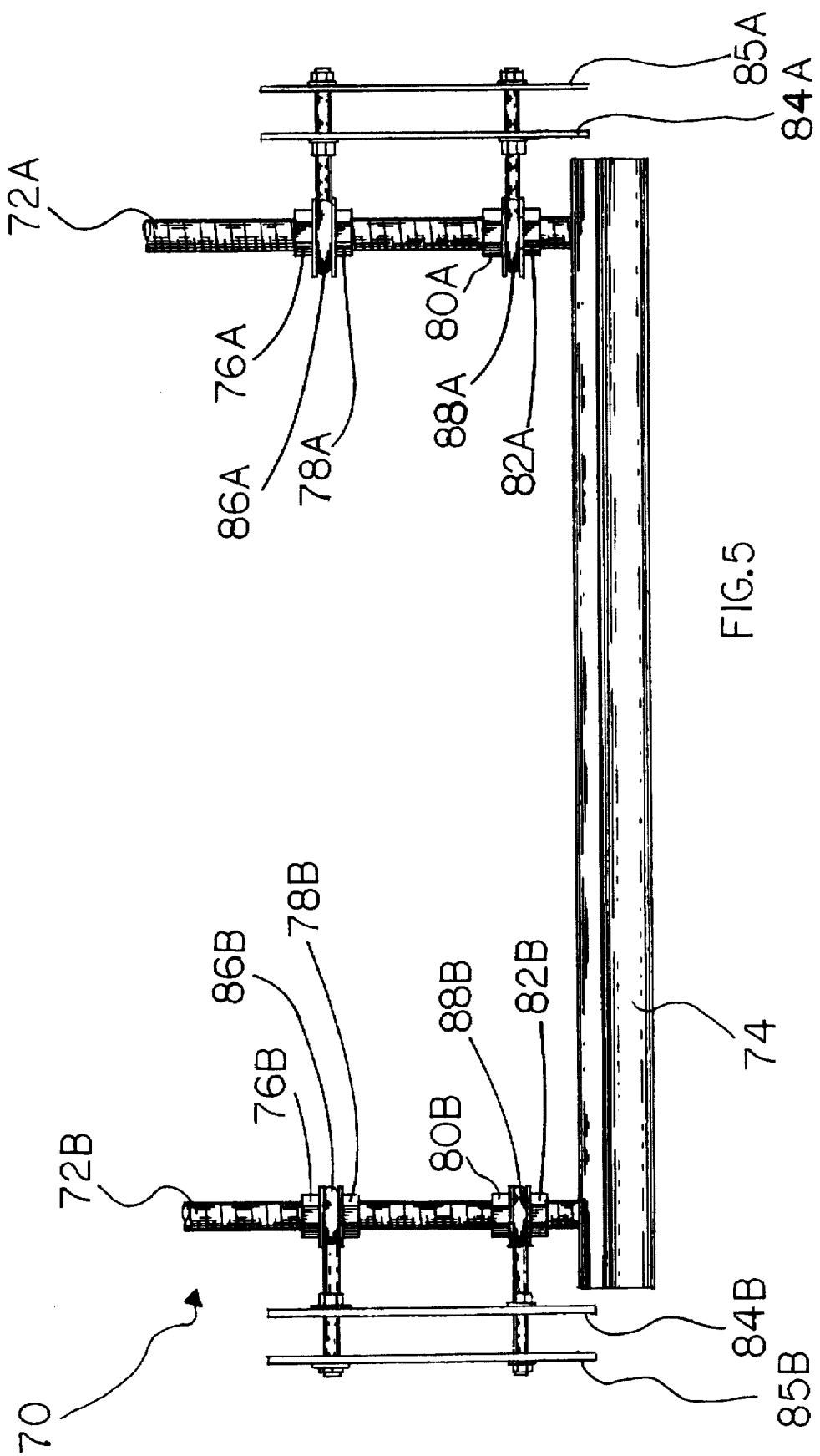

FRICTIONALLY RESTRAINED VEHICULAR STORAGE UNIT

FIELD OF THE INVENTION

This invention relates to vehicular storage units. More particularly, it relates to a method and device for frictionally restraining a vehicular storage unit.

BACKGROUND

Safe and effective storage in vehicles is a recognized and longstanding problem. It is evident particularly in the trucking industry and even more particularly in the sleeper compartments of tractor trailers. Makeshift solutions have been attempted, but they have not satisfied the overwhelming need for a storage system which may be held in place securely without damage to the vehicle's body.

With respect to the trucking industry, tractor trailer cabs often include a sleeper compartment which houses a bed therein. At the foot of the bed, there is an open channel. Truckers often call this channel the pit and use it for storage. With storage area at a premium, some truckers have attempted to increase available storage area by such methods as stacking milk crates in the pit against the adjacent side wall. However, these methods have proven dangerously unstable, and they often place truckers in violation of strict insurance regulations prohibiting insecure storage.

Bolting storage units to the vehicle's walls can provide adequate restraint, but it necessarily inflicts permanent damage to the body of the cab. Permanent attachment and damage may be undesirable to those who own their own truck. Furthermore, it is expressly prohibited by most truck renting and leasing companies which have come to own a large share of today's trucks. Additionally, assuming it were permissible, such permanent attachment is impractical for those truckers who use a multiplicity of trucks over a short span of time. Consequently, simultaneously complying with insurance regulations, avoiding damage to the vehicle's body, and satisfying a multiplicity of other concerns has been difficult if not impossible for truckers seeking increased personal storage area.

For these and other reasons, there exists a need for a storage unit for tractor trailer cabs, automobiles, and the like which is held securely in place without the need for additional or alternative, possibly damaging connection to the vehicle's interior.

SUMMARY

With the foregoing in mind, the present invention's principal object is to provide a method and device for fictionally restraining a vehicular storage unit safely and securely without the need for additional or alternative, possibly damaging connection to the vehicular body.

A further object of the invention is to provide a vehicular storage unit which significantly expands the effective storage area available in the vehicle.

Another object of the invention is to provide frictionally restrained storage units which are modular so that a user may easily and quickly install such units in a vehicle to suit the vehicle's available interior space.

From this specification, these and other objects and advantages of the present invention will become obvious to those skilled in the art. In carrying out the aforementioned objects, the present invention essentially comprises a frictionally engaging device having an operative engaging portion for frictional contact with the interior of the vehicle, a means for attaching that device to a storage unit, and a means for actuating the frictionally engaging device once it is attached to the storage unit to cause frictional engagement between the operative engaging portion of the frictionally engaging device and the interior of the vehicle. With the frictionally engaging device mounted on a storage unit, the storage unit located in the interior of a vehicle, and the engaging device actuated to an engaging position, the device frictionally restrains the storage unit in a safe and secure manner without inflicting damage to the vehicular interior.

While the frictionally engaging device may take many forms, it may be crafted as an elongated rod with an engaging end, the rod being capable of selective extension and retraction by the actuating means. The attaching means may be a short post with two ends: one adapted for rigid connection to a storage unit and the other having a generally circular opening therein for allowing the elongated rod to pass therethrough in a slidable relationship. With this type of frictionally restraining means and attaching means, the actuating means may be comprised of threads disposed on the elongated rod in combination with an actuating nut which is bigger than the opening in the second end of the attaching post. For proper operation, the actuating nut may be threaded onto the elongated rod between the engaging end of the elongated rod and the second end of the attaching post. With this arrangement, a user may drive the engaging end of the elongated rod into frictional engagement with the interior of the vehicle by selective rotation of the actuating nut so that the nut travels along the rod away from the rod's engaging end, presses against the upper surface of the rigid attaching post, and thereby drives the engaging end of the rod into frictional contact with the interior of the vehicle to restrain the storage unit.

While it is possible that a single device may restrain a given storage unit, it is most advantageous to have two or more appropriately situated devices. For example, assuming there to be a storage unit with first and second ends with a height slightly less than the height of the sleeper compartment and a base sized to fit within the pit at the bottom of the bed, there may be a device attached near the top of each end of the storage unit oriented to extend and retract in a vertical direction. When the actuating nuts drive the engaging ends of the rods into frictional engagement with the ceiling of the vehicle's interior, those devices would frictionally restrain the tops of both storage unit ends. Furthermore, the bottom of the storage unit would be restrained by gravity supplemented by a downward force corresponding to the upward force exerted by the devices. One wishing added security might locate a third frictionally restraining device at the base of the storage unit in the pit area oriented to extend and retract in a horizontal plane. This device, when actuated, would brace the storage unit further by causing frictional engagement between the storage unit, the bottom of the bed, and the adjacent side wall of the sleeper compartment.

Single rod restraining devices as described above would serve adequately the purpose of restraining the storage unit. However, the force necessary to restrain the storage unit and its enclosed items may be better distributed over a greater area. To do this, each engaging device might comprise two rods with the engaging ends of the rods connected by an elongated bar. Such an arrangement would reduce further the potential for damage to the interior of the vehicle by spreading the applied restraining force over a greater area.

For ease of installation of the storage unit into a vehicle and for the unit to be adaptable to vehicles of different sizes, the unit may be modular. For example, it could be divided into a top portion and a bottom portion. Also, it could be comprised of multiple units adapted to be joined side-by-side. Once situated in the vehicle, the portions of the unit could be joined by connecting means such as bolts, glue, a strap surrounding the joined portions, nails, screws, or any other appropriate means.

The foregoing discussion broadly outlines the more important features of the invention to enable a better understanding of the detailed description that follows and to instill a better appreciation of the inventor's contribution to the art. Before an embodiment of the invention is explained in detail, it must be clear that the following details of construction, descriptions of geometry, and illustrations of inventive concepts are mere examples of possible manifestations of the invention.

BRIEF DESCRIPTION OF THE DRAWINGS

FIG. 3 is a top sectional view of an attaching post taken along the line 3—3 in FIG. 1.

FIG. 4 is a perspective view of the unit's second frictionally restraining device shown attached to the storage unit of FIG. 1.

FIG. 5 is a top plan view of the storage unit's third frictionally restraining device shown apart from the storage unit.

DETAILED DESCRIPTION OF THE PREFERRED EMBODIMENT

Figure 1:
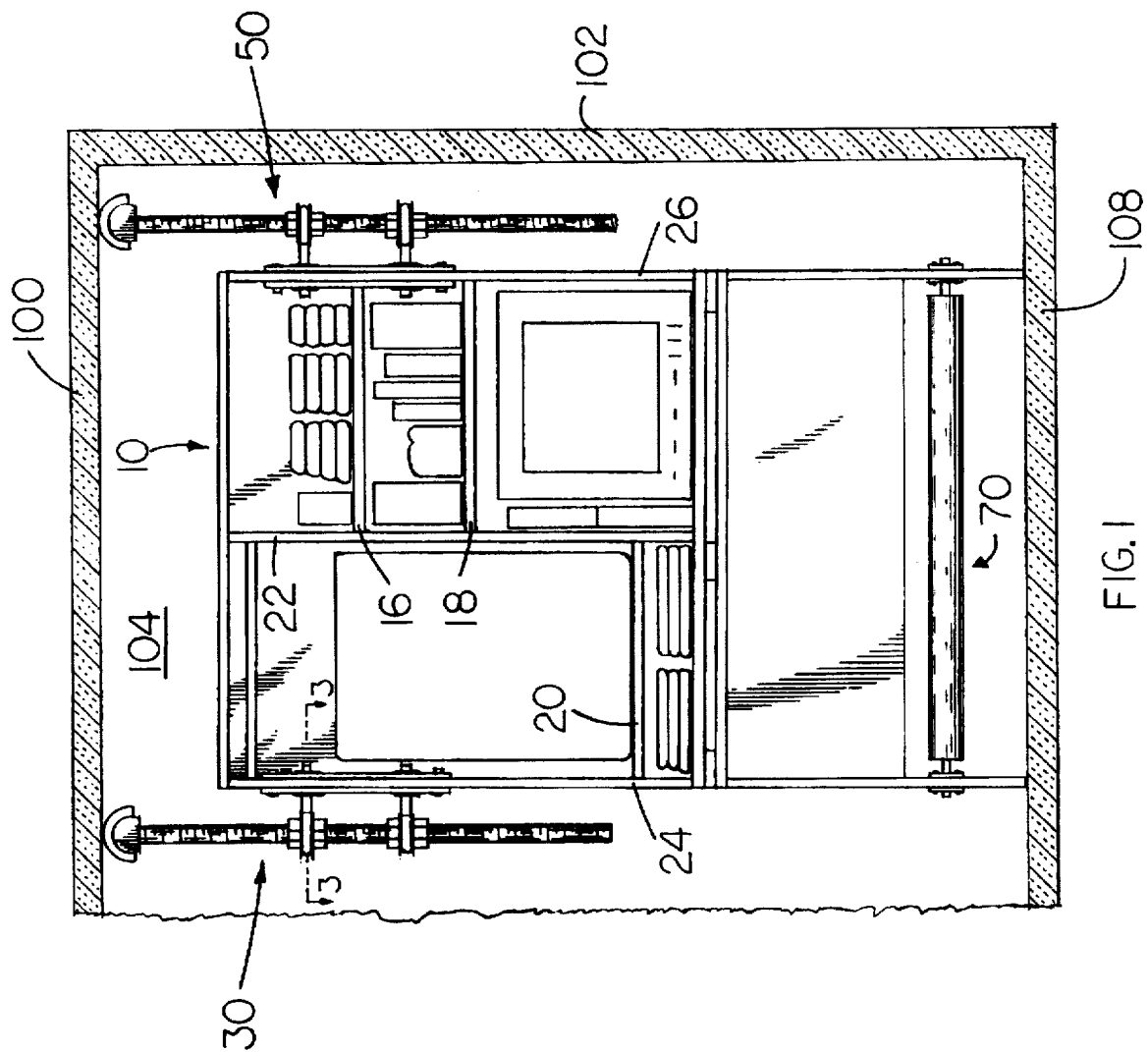
FIG. 1 is a front elevational view of a storage unit with embodiments of the present invention attached thereto, the unit being installed in a partially sectioned sleeper compartment of a typical tractor trailer cab.
Figure 2:
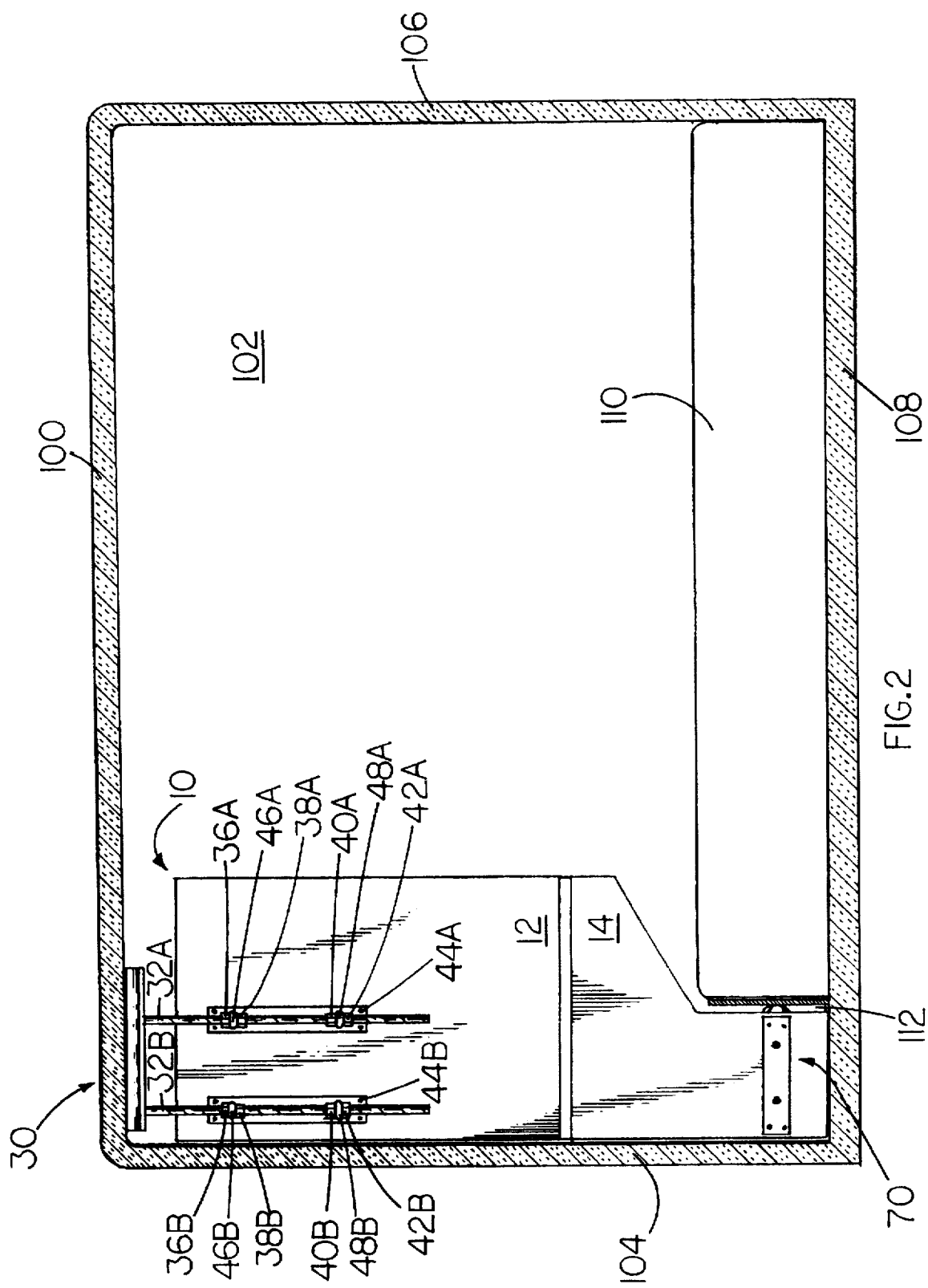
FIG. 2 is a side elevational view of the storage unit of FIG. 1 showing the unit's first frictionally restraining device.

Although storage units employing the present invention may be manufactured to fit automobiles and many other types of vehicles, the unit described and shown as the preferred embodiment is adapted for use in the sleeper compartment of a typical tractor trailer cab. Referring more particularly to FIG. 1 which shows a storage unit 10 employing embodiments of the present invention and FIG. 2 which shows the storage unit 10 of FIG. 1 from the side. The unit 10 is shown properly installed in the sleeper compartment of a partially sectioned typical tractor trailer cab. The sleeper compartment has a ceiling 100 which is atop a rear wall 102, first and second side walls 104 and 106 respectively, and a support at the front of the cab which has been sectioned away in the figure. The compartment further includes a floor 108 and a generally rectangular bed 110 which is not included in FIG. 1 so that the storage unit 10 may be shown more completely. The bed 110 rests on the floor 108 with its upper end adjacent the second side wall 106 and a side edge adjacent the rear wall 102. There is an open channel 112 between the bottom end of the bed 110 and the first side wall 104. In the trade, this channel 112 is called the pit.

Referring again to FIG. 2, the storage unit 10 has an upper portion 12 and a lower portion 14. In the preferred embodiment, the lower portion 14 of the storage unit 10 is formed with a substantially straight rear wall. The base of the rear wall comprises a side of a peninsula-like base segment of the lower portion 14. The base segment has a width slightly less than the distance between the bottom end of the bed 110 and the first side wall 104. The upper end of the peninsula-like base segment is at substantially the height of the bed 110. From there, the front of the storage unit 10 projects at an incline outwardly over the bed 110. This outward projection allows for increased storage area in the upper portion 12. From the outwardly inclining surface, the front of the lower portion 14 continues substantially vertically upward to a substantially horizontal and planar top. The upper portion 12 of the storage unit 10 has a generally planar bottom which corresponds in size and shape to the top of the lower portion 14 so that the two may be joined most advantageously by any appropriate connecting means. From its bottom, the upper portion 12 rises vertically upward to give the storage unit 10 a height slightly less than the height of the sleeper compartment ceiling 100.

Figure 6:
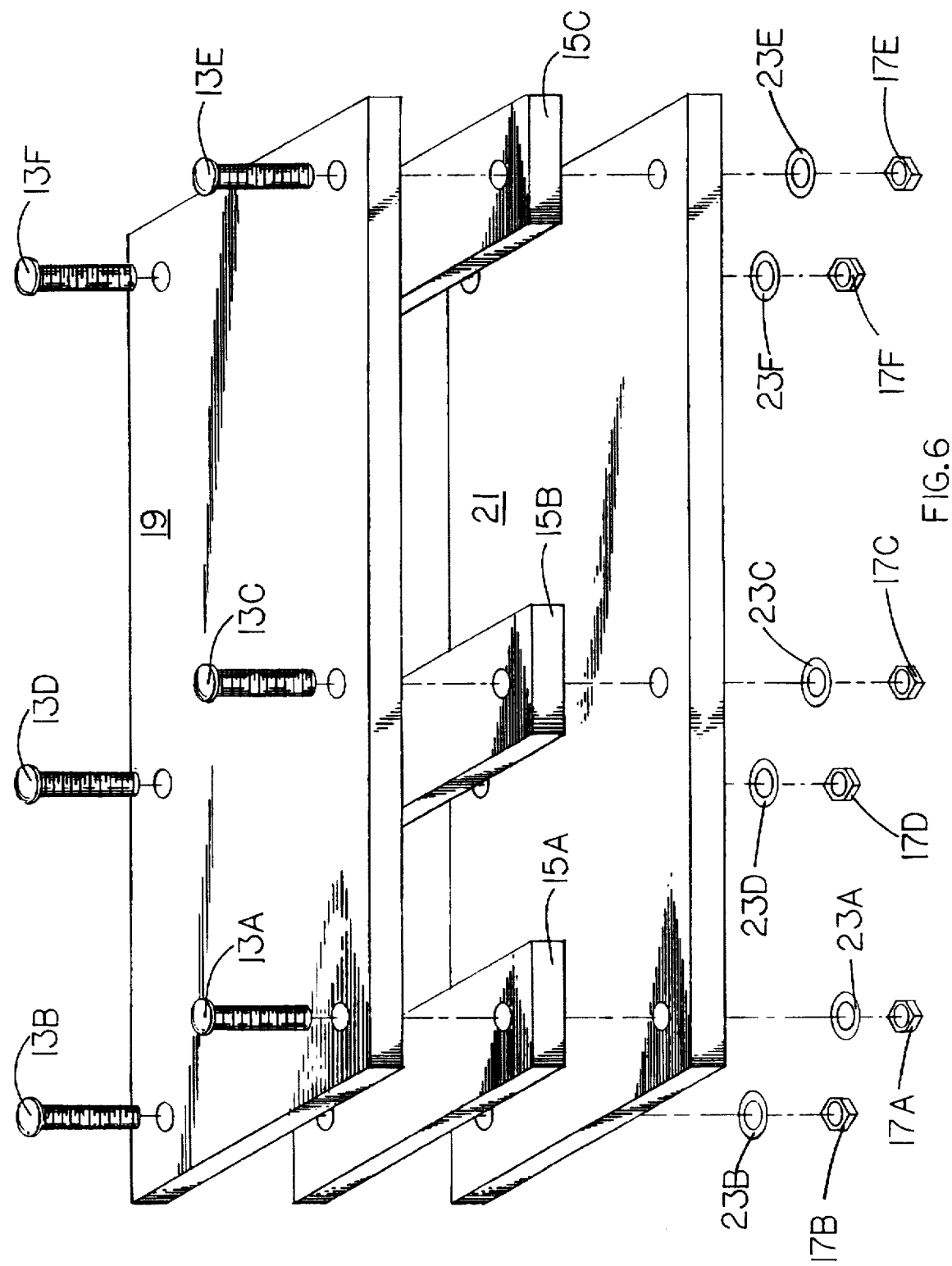
FIG. 6 is a perspective view of the preferred embodiment's means for connecting the top surface of the lower portion to the bottom surface of the upper portion.

FIG. 6 depicts the means by which the upper and lower portions 12 and 14 of the storage unit 10 are connected in the preferred embodiment. Connecting slats 15A, 15B, and 15C are elongated slats with rectangular cross sections. They are spaced with slat 15A generally parallel to and near a first end 24 of the storage unit 10, slat 15B generally parallel to slat 15A near the center of the storage unit 10, and slat 15C generally parallel to and near a second end 26 of the storage unit 10. Threaded connecting bolts 13A, 13B, 13C, 13D, 13E, and 13F pass through holes in the bottom 19 of upper portion 12, holes in slats 13A, 13B, and 13C, holes in the top 21 of lower portion 14, and finally washers 23A, 23B, 23C, 23D, 23E, and 23F. Connecting nuts 17A, 17B, 17C, 17D, 17E, and 17F are threaded onto the connecting bolts 13A, 13B, 13C, 13D, 13E, and 13F whereby the upper and lower portions 12 and 14 are joined.

In the preferred embodiment, the upper portion 12 of the storage unit 10 includes shelves 16, 18, and 20 and a partition 22. Together, the shelves 16, 18, and 20 and the partition 22 make more efficient use of the increased storage area provided by the storage unit 10. FIG. 1 shows the storage unit 10 as it might typically be loaded with personal items and the like such as clothing, food, and appliances. Though not shown in the drawings, the assembled storage unit 10 could be comprised of more than one individual, modular unit joined together side-by-side by appropriate means. Such modular units would allow one to adapt the size of the formed storage unit 10 to suit the size of the sleeper compartment.

As one might surmise, a heavy device such as the storage unit 10 could pose a substantial danger to occupants of the vehicle if not restrained properly. However, conventional means of restraint such as bolting and the like are unavailable to truckers who do not own their vehicles or do not wish to inflict such permanent damage to their vehicles. The present invention safely and securely restrains articles such as the storage unit 10 without the need for permanent attachment to the vehicle's interior.

In the preferred embodiment, the storage unit 10 is restrained by three frictionally restraining devices 30, 50, and 70. A first device 30 is attached securely to a first end 24 of the storage unit 10 sufficiently near the top thereof so that, when actuated to extend beyond the periphery of the storage unit 10, the device 30 will engage frictionally the ceiling 100 of the sleeper compartment. The second device 50 is attached similarly to a second end 26 of the storage unit 10. The third device 70 is situated on the lower portion 14 of the unit 10 to actuate in a horizontal plane. When all three devices 30, 50, and 70 are actuated, the first end 24 of the unit 10 is restrained at its top by the upward frictional force of the first restraining device 30 and at its bottom by the weight of the unit 10 plus the corresponding downward force from the device 30. The second end 26 is restrained at its top by the upward frictional force of the restraining device 50 and at its bottom by the weight of the unit 10 plus the corresponding downward force from the device 50. The bottom of the unit 10 is remained further by the force of the third device 70 bracing itself against the bottom end of the bed 110 and the first side wall 104 of the sleeper compartment.

Each device 30, 50, and 70 is comprised of a frictionally engaging device which is attached to the unit 10 by an attaching means and is actuated into frictional engagement with the interior of the sleeper compartment by an actuating means. Each frictionally restraining device, however mounted, may take many forms such as an appropriately actuated cam device, a lever device, a manually engaged and attached device, the device shown in the preferred embodiment, or any other suitable device which employs the present invention. In the preferred embodiment, the devices 30, 50, and 70 are substantially similar.

Referring to FIGS. 1, 2, 3, and 7, the first frictionally restraining device 30 is attached to the first end 24 of the storage unit 10 by first and second attaching plates 44A and 44B. The plates 44A and 44B are substantially flat and rectangular in shape, and are secured to the unit 10 at approximately equal heights by any appropriate means such as bolts, screws, nails, glue, or the like. The first plate 44A has upper and lower attaching posts 46A and 48A rigidly attached thereto. Each attaching post 46A and 48A has a first end proximal to the attaching plate 44A and a second end distal to the plate 44A. The second plate 44B has substantially identical upper and lower attaching posts 46B and 48B similarly attached. The plates 44A and 44B are attached to the unit 10 so that the upper post 46A is directly over the lower post 48A and the upper post 46B is directly over the lower post 48B. The second ends of each of the posts 46A and 48A have generally circular openings therein which are sufficiently large to allow an elongated rod 32A to slide therethrough. FIG. 3 depicts an exemplary opening at 39. The second ends of posts 46B and 48B have similar openings to allow an elongated rod 32B to slide therethrough.

Each of the elongated rods 32A and 32B has threads disposed thereon. Elongated rod 32A has four nuts 36A, 38A, 40A, and 42A threaded thereon. Upper actuating nut 36A is located on the elongated rod 32A immediately above the upper attaching post 46A. Upper locking nut 38A is located immediately below the upper attaching post 46A. Lower actuating nut 40A is located on the elongated rod 32A immediately above the lower attaching post 48A. Lower locking nut 42A is located on the elongated rod 32A immediately below the lower attaching post 48A. Like elongated rod 32A, elongated rod 32B has four nuts, upper actuating nut 36B, upper locking nut 38B, lower actuating nut 40B, and lower locking nut 42B, similarly threaded thereon. The ends of the elongated rods 32A and 32B are their engaging portions in that they are the portions of the engaging device which protrude from the top of the storage unit 10 to frictionally engage the vehicle's interior. In this description, they are termed engaging ends.

Since the force to be exerted by the engaging ends of the rods 32A and 32B may at times be great, an elongated bar 34 is attached rigidly to the ends of the rods 32A and 32B to connect them. The elongated bar 34 increases the area over which the restraining force is applied. As a result, the quality of frictional restraint is unaffected, but the possibility for damage to the vehicle's interior is reduced further.

Referring to FIGS. 1 and 4, one can see that the second frictionally restraining device 50 is a mirror image of the first device 30. It is attached to the second end 26 of the storage unit 10 by first and second attaching plates 64A and 64B. From the plates 64A and 64B, upper attaching posts 66A and 66B and lower attaching posts (not shown) extend from their first, proximal ends to their second, distal ends. The second, distal ends have threaded elongated rods 52A and 52B slidably engaged therewith. Upper actuating nut 56A and upper locking nut 58A are disposed on elongated rod 52A in positions corresponding to the positions of their nominal counterparts on the first restraining device 30. Upper actuating nut 56B and upper locking nut 58B are disposed likewise on elongated rod 52B. The elongated rods 52A and 52B also have lower actuating and locking nuts which are not shown in the drawings. An elongated bar 54 is attached rigidly to the engaging ends of the elongated rods 52A and 52B to connect them and to distribute the applied force.

Figure 7:
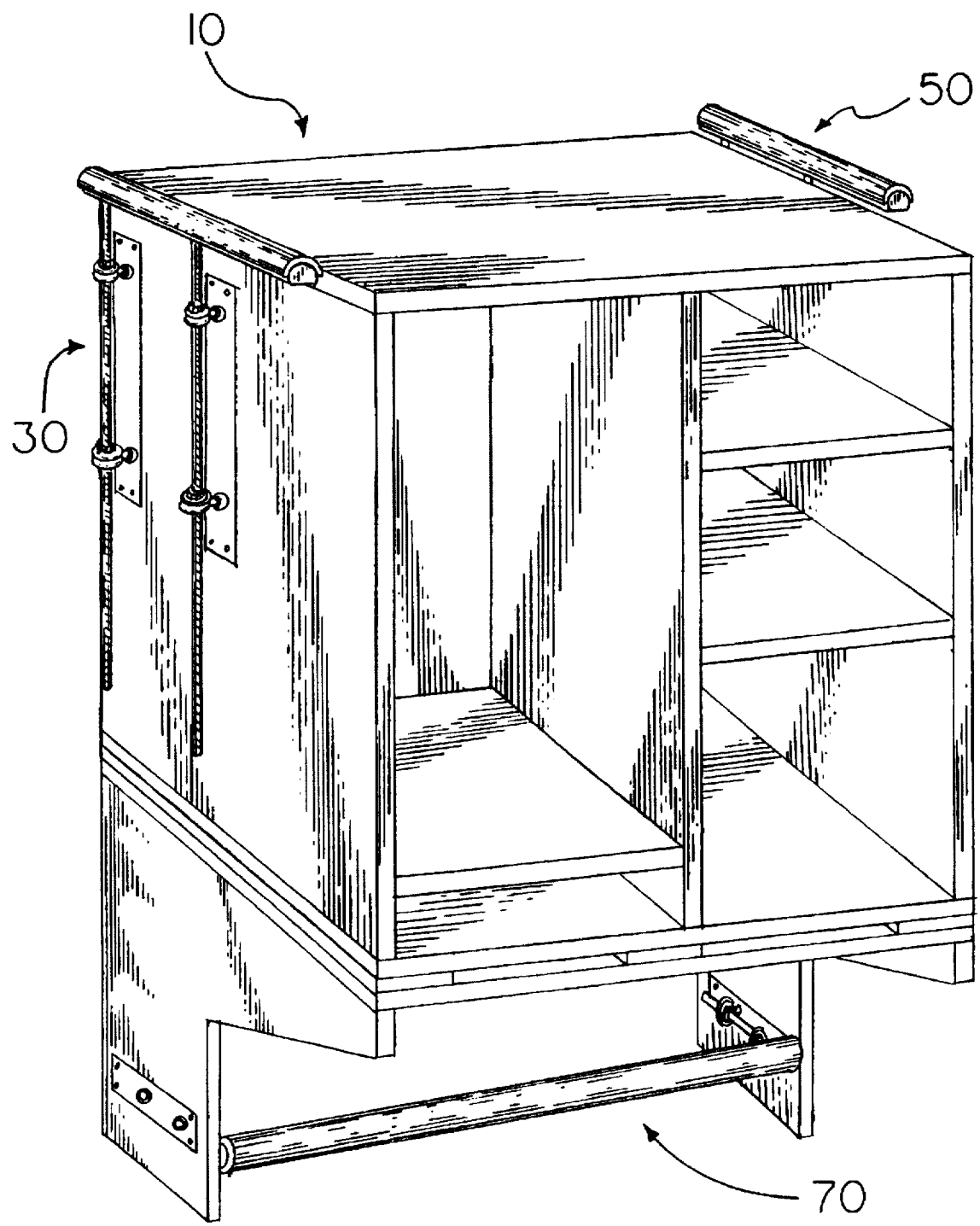
FIG. 7 is a perspective view of a storage unit employing embodiments of the present invention.

The third frictionally restraining device 70, which is shown alone in FIG. 5, is similar to the first and second devices 30 and 50. However, as FIG. 7 shows, it is oriented for extensive and retractive actuation in a horizontal plane and it has its attaching means secured to the insides of the lower portion 14 of the storage unit 10 such that its elongated bar 74 traverses the span between the first and second ends 24 and 26 of the storage unit 10. Referring again to FIG. 5, the device 70 includes an inside attaching plate 84A secured to the inside of the first end 24 of the storage unit 10 near its base and an inside attaching plate 84B secured to the inside of the second end 26 of the storage unit 10 near its base. On the outer sides of the first and second ends 24 and 26, there are outside attaching plates 85A and 85B. Rear attaching post 86A and front attaching post 88A extend through the outside attaching plate 85A, through the first end 24 of the storage unit 10, and through the inside attaching plate 84A toward the middle of the unit 10. In a similar manner, rear attaching post 86B and front attaching post 88B extend through the outside attaching plate 85B, through the second end 26 of the storage unit 10, and through the inside attaching plate 84B toward the middle of the unit 10. The ends of each of the attaching posts 86A, 86B, 88A, and 88B have generally circular openings therein which are sufficiently large to allow an elongated rod 72A to slide through attaching posts 86A and 88A and an elongated rod 72B to slide through attaching posts 86B and 88B.

Each of the elongated rods 72A and 72B has threads disposed thereon. Elongated rod 72A has four nuts 76A, 78A, 80A, and 82A threaded thereon. Front actuating nut 82A is located on the elongated rod 72A immediately beyond the front attaching post 88A. Front locking nut 80A is located immediately inside the front attaching post 88A. Rear actuating nut 78A is located on the elongated rod 72A immediately beyond the rear attaching post 86A. Rear locking nut 76A is located on the elongated rod 72A immediately behind the rear attaching post 86A. Like elongated rod 72A, elongated rod 72B has four nuts, from actuating nut 82B, front locking nut 80B, rear actuating nut 78B, and rear locking nut 76B, threaded thereon in a similar fashion. Like the first and second devices 30 and 50, an elongated bar 74 is attached rigidly to the engaging ends of the elongated rods 72A and 72B to connect them and to distribute the applied force.

Upper attaching post 46A, which is part of the first restraining device 30, typifies the remainder of the attaching posts. FIG. 3 is a top sectional view of upper attaching post 46A taken along the line 3—3 in FIG. 1. In this preferred embodiment, the post 46A is in the form of a threaded eye bolt. The elongated rod 32A slides through the open "eye" 39 of the eye bolt 46A. The eye 39 has a rubber bushing 37 therein to ensure a snug but slidable fit between the elongated rod 32A and the post 46A. The threaded portion of the eye bolt 46A passes completely through the first end 24 of the storage unit 10. To each side of the first end wall 24, there is an attaching plate 44A and 47. The attaching plates 44A and 47 prevent damage to the first end wall 24 and allow for a more secure connection of the attaching posts. Just outside the attaching plates 44A and 47, there are washers 41A and 41B which are immediately followed by lock washers 43A and 43B. In turn, the lock washers 43A and 43B are pressed in place by nuts 45A and 45B. By substantially identical mechanisms, each of the attaching posts is secured to the storage unit 10.

The proper method of using the preferred embodiment of the present invention begins with situating the lower portion 14 of the storage unit 10 in the sleeper compartment with its base portion in the pit area 112. Next, one would situate and attach the upper portion 12 of the storage unit 10 to the lower portion 14 so that the two in substance form the single storage unit 10.

With the storage unit 10 assembled, one would next actuate the three frictionally restraining devices 30, 50, and 70 into frictional engagement with the vehicle's interior. To do so, one might begin with the upper devices 30 and 50 by backing off the upper and lower locking nuts 38A, 38B, 42A, 42B, 58A, and 58B on each of the elongated rods 32A, 32B, 52A, and 52B to permit extensive actuation of the rods. One would next drive the elongated bars 34 and 54 which are at the engaging ends of the rods 32A, 32B, 52A, and 52B into tight frictional engagement with the ceiling 100 of the sleeper compartment by selectively rotating the upper and lower actuating nuts 36A, 36B, 40A, 40B, 56A, and 56B on each of the elongated rods 32A, 32B, 52A, and 52B. To prevent untimely disengagement of the elongated bars 34 and 54 from the ceiling 100, one would lock the upper and lower actuating nuts 36A, 36B, 40A, 40B, 56A, and 56B in place by selectively rotating the upper and lower locking nuts 38A, 38B, 42A, 42B, 58A, and 58B into locking engagement with the lower surface of the upper and lower attaching posts 46A, 46B, 48A, 48B, 66A, and 66B.

To add to the security provided by the first and second restraining devices 30 and 50, one would actuate into frictional engagement the third device 70 in a similar manner. One would first back off the front and rear locking nuts 80A, 80B, 76A, and 76B and then selectively rotate the front and rear actuating nuts 82A, 82B, 78A, and 78B to drive the elongated bar 74 into tight frictional engagement with the bottom end of the bed 110 and the rear of the storage unit 10 lower portion 14 into tight frictional engagement with the first side wall 104 of the sleeper compartment. Finally, one would selectively rotate the front and rear locking nuts 80A, 80B, 76A, and 76B into locking engagement with the rear surface of the front and rear attaching posts 88A, 88B, 86A, and 86B. With these steps accomplished, the storage unit 10 would be frictionally restrained against even the most extreme external forces without damage to the interior of the sleeper compartment.

From the foregoing, it is apparent that the present invention has many advantages. For example, the invention contributes to the art a method and device which enables the frictional restraint a vehicular storage unit. The invention does so safely and securely without the need for intrusive and damaging connection to the vehicular body. Furthermore, the storage area available to the user is increased significantly. In addition, a user may assemble and disassemble modular versions of such frictionally restrained storage units to suit the space available in the vehicle's interior.

Although the invention has been shown and described with reference to a certain preferred embodiment, those skilled in the art can conceive of alternative embodiments. For example, embodiments of the invention may be created which incorporate the major features and advantages of the invention without incorporating all of the features included in the preferred embodiment. With this possibility in mind, the following claims are intended to define the scope of protection to be afforded this inventor, and the claims shall be deemed to include equivalent constructions which are within the spirit and scope of the present invention.

I claim as deserving the protection of United States Letters Patent:

1. An apparatus for frictionally restraining a storage unit in an interior of a vehicle to resist motion relative to the vehicle thereby eliminating need for alternative or additional connection to the vehicle's interior, the apparatus comprising:

a) at least one frictionally engaging device with an operative engaging portion, the frictionally engaging device comprised of at least one elongated rod with an engaging end as its operative engaging portion;

b) a means for attaching the frictionally engaging device to a storage unit desired to be restrained comprised of at least one attaching post with a first end and a second end wherein the first end is adapted for rigid connection to a storage unit and the second end with an opening therein; and c) a means for actuating the frictionally engaging device operably connected to the frictionally engaging device for enabling the frictionally engaging device to exert a frictionally restraining force upon the vehicle's interior when the apparatus is connected to a storage unit, the storage unit is in a vehicle, and the frictionally engaging device is actuated whereby need for alternative or additional connection is eliminated;

d) wherein the opening in the second end of the attaching post is sufficient in size for allowing the frictionally engaging rod to pass therethrough in a slidable relationship and wherein the actuating means is comprised of threads disposed on the frictionally engaging rod and at least one actuating nut sized to be threaded onto the frictionally engaging rod and with an outer dimension sufficiently larger than the opening in the second end of the attaching post to prevent the nut from passing through the opening whereby the nut may be threaded onto the rod between the engaging end of the rod and the second end of the attaching post whereby the engaging end of the rod may be threadedly extended by selective rotation of the actuating nut to cause the actuating nut to travel along the frictionally engaging rod away from the rod's engaging end to press against the attaching post and to drive the frictionally engaging rod by means of the threads on the frictionally engaging rod.

2. The apparatus of claim 1 wherein each frictionally engaging device is comprised of two elongated rods, and the engaging ends of the rods are connected by an elongated bar whereby the restraining force of the engaging rods is spread over a greater area.

3. A frictionally restrained vehicular storage unit adapted for use in a sleeper compartment of a tractor trailer cab of the type having an interior with a rear wall, first and second side walls, a ceiling, a floor, a bed disposed on the floor, a given interior height and a channel between an end of the bed and the cab's first side wall which defines an open pit area, the storage unit comprising:

a) a main storage unit sized to fit within the tractor trailer sleeper compartment, the main storage unit with a storage area contained therein sufficiently large for storing a multiplicity of personal items of a user;

b) at least one frictionally engaging device having an operative engaging portion adapted for frictionally engaging the interior of the sleeper compartment;

c) a means for rigidly attaching the device to the storage unit; and d) a means for actuating the frictionally engaging device, the actuating means being operably connected to the frictionally engaging device to enable it to exert a frictionally restraining force upon the vehicle's interior when the apparatus is connected to a storage unit, the storage unit is in a vehicle, and the frictionally engaging device is actuated whereby any need for alternative or additional connection to the vehicle's interior is eliminated.

4. The storage unit of claim 3 wherein the main storage unit has a height slightly less than the interior height of the sleeper compartment and the main storage unit, and the main storage unit is comprised of a multiplicity of sections, each section with a storage area contained therein sufficiently large for storing a multiplicity of personal items of a user and the sections adapted to be held together by a means for connecting the sections whereby a user may install the unit in a vehicle more easily by situating the individual sections in the vehicle's interior separately and connecting them once inside the vehicle to form a substantially unitary storage unit.

5. The storage unit of claim 4 wherein the main storage unit is comprised of a cabinet, and the frictionally engaging device is comprised of at least one elongated rod having an engaging end; the rod being capable of selective extensive and retractive actuation by the actuating means whereby the engaging end of the rod may be extended into a position of cabinet-restraining frictional engagement with the interior of the sleeper compartment.

6. The storage unit of claim 5 wherein the attaching means comprises at least one attaching post having a first end and a second end with the first end being rigidly connected to the storage unit and the second end including an opening therein sufficient for allowing the frictionally engaging rod to pass therethrough in a slidable relationship, and the actuating means is comprised of threads disposed on the frictionally engaging rod and at least one actuating nut adapted to be threaded onto the rod and having an outer dimension sufficiently larger than the opening in the second end of the attaching post such that the nut cannot pass therethrough and the nut may be threaded onto the elongated rod between the engaging end of the rod and the second end of the attaching post whereby the engaging end of the rod may be threadably extended by selective rotation of the actuating nut.

7. The storage unit of claim 6 wherein each frictionally engaging device is comprised of two elongated rods, the engaging ends of the rods being connected by an elongated bar whereby the force of the engaging rods is spread over a greater area and damage to the interior surface of a sleeper compartment is minimized further.

8. The storage unit of claim 7 further comprising a third frictionally engaging device disposed in a horizontal plane at a bottom portion of the cabinet.

9. The storage unit of claim 3 wherein the storage unit is a cabinet having a top portion with a storage area contained therein sufficiently large for storing a multiplicity of personal items of a user, a bottom portion with a storage area contained therein sufficiently large for storing a multiplicity of personal items of a user, the bottom portion with a segment thereof adapted to fit in the pit era sleeper compartment, and the storage unit with first and second ends extending upwardly from the bottom portion of the cabinet.

10. The storage unit of claim 9 wherein there are at least two independently actuatable frictionally engaging devices with a first frictionally engaging device attached to the first end of the cabinet and a second frictionally engaging device attached to the second end of the cabinet, and the devices are oriented on the cabinet with vertical axes of actuation.

11. The storage unit of claim 10 further comprising a third frictionally engaging device disposed in a horizontal plane and attached to the bottom portion of the cabinet.

12. A method of frictionally restraining a storage unit in a sleeper compartment era tractor trailer cab of the type with an interior with a rear wall, first and second side walls, a ceiling, a floor, a bed disposed on the floor, and a channel between an end of the bed and the cab's first side wall which defines an open pit area to resist motion relative to the interior of the sleeper compartment thereby eliminating need for alternative or additional connection to the sleeper compartment interior, the method comprising the steps of:

a) providing a main storage unit adapted to fit within the tractor trailer cab sleeper compartment with a bottom portion with a base segment thereof sized to fit in the pit of the sleeper compartment, the main storage unit having rigidly attached thereto at least one frictionally engaging device having an operative engaging portion for frictionally-restraining contact with the interior of the sleeper compartment; the storage unit further comprising a means for actuating the frictionally engaging device, the actuating means being operably connected to the frictionally engaging device for moving the engaging portion of the device beyond a periphery of the main storage unit from a nonengaging position to an engaging position to frictionally engage the interior of the sleeper compartment to restrain the storage unit relative to the sleeper compartment without need for alternative or additional connection;

b) locating the storage unit in a tractor trailer sleeper compartment in which the storage unit is to be installed with the base segment of the storage unit located in the open pit area of the sleeper compartment; and c) actuating the fictionally engaging device to cause frictionally-restraining contact between the operative engaging portion of the device and the interior of the sleeper compartment whereby the storage unit is restrained with respect to the sleeper compartment without need for alternative or additional connection with the sleeper compartment's interior.

* * * * *